(12) United States Patent
Boland et al.

(10) Patent No.: US 6,956,939 B1
(45) Date of Patent: Oct. 18, 2005

(54) APPARATUS, METHOD AND SYSTEM FOR MESSAGE-BASED INTELLIGENT TANDEMING OF INCOMING CALLS TO APPLICATION NODES IN TELECOMMUNICATION SYSTEMS

(75) Inventors: Richard Robert Boland, LaGrange, IL (US); Ismael Lopez, Berwyn, IL (US); Mark Alan McCormick, Naperville, IL (US); Diane Marie Russell, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 518 days.

(21) Appl. No.: 09/591,472

(22) Filed: Jun. 9, 2000

(51) Int. Cl.$^7$ .............................................. H04M 7/00
(52) U.S. Cl. ......................... 379/220.01; 379/221.01; 379/221.14
(58) Field of Search ...................... 379/201.01, 207.02, 379/207.14, 207.04, 211.01–212.01, 220.01, 379/221.01, 221.14, 242, 219, 221.08, 229; 455/414.1, 417

(56) References Cited

U.S. PATENT DOCUMENTS

| | | | |
|---|---|---|---|
| 5,905,789 A * | 5/1999 | Will ...................... | 379/211.03 |
| 5,933,778 A * | 8/1999 | Buhrmann et al. ..... | 379/211.02 |
| 6,175,574 B1 * | 1/2001 | Lewis ........................ | 379/230 |
| 6,219,551 B1 * | 4/2001 | Hentila et al. .......... | 379/221.08 |
| 6,397,055 B1 * | 5/2002 | McHenry et al. ...... | 379/114.05 |
| 6,405,028 B1 * | 6/2002 | DePaola et al. ............ | 455/406 |
| 6,628,772 B1 * | 9/2003 | Cox et al. .............. | 379/218.01 |

* cited by examiner

Primary Examiner—Ovidio Escalante

(57) ABSTRACT

An apparatus, method and system are provided for message-based intelligent tandeming of an incoming call to an application node in telecommunication systems. The various embodiments utilize a new parameter, referred to as a tandem parameter, to designate whether incoming calls to a particular subscriber are to be tandemed to an application node or are to be delivered directly to the subscriber. The preferred system embodiment includes an adjunct network entity, a database, and a switching center. The adjunct network entity, such as a service circuit node or service control point, has one or more application nodes or platforms, supporting various telecommunication services such as prepaid services, calling party pays services, and one number services. The database, such as a home location register or visitor location register, stores information such as subscriber profiles, and includes storing the tandem parameter. The switching center, such as a mobile switching center, is configured to receive an incoming call leg directed to a called party directory number, to transmit a first message to the database to determine call treatment instructions, and to receive from the database a second message containing a tandem parameter. When the tandem parameter does not indicate tandeming, the incoming call leg is routed to the called party directory number, and when the tandem parameter does indicate tandeming, the switching center obtains a routing parameter and performs digit analysis of the called party directory number. The switching center, when the digit analysis has been performed successfully, tandems the incoming call leg to the application node, and when the digit analysis has not been performed successfully, provides an individually configured default mode for the incoming call leg.

42 Claims, 3 Drawing Sheets

100

200

APPARATUS, METHOD AND SYSTEM FOR MESSAGE-BASED INTELLIGENT TANDEMING OF INCOMING CALLS TO APPLICATION NODES IN TELECOMMUNICATION SYSTEMS

CROSS-REFERENCE TO A RELATED APPLICATION

This application is related to Boland et al., U.S. patent application Ser. No. 09/591,471, entitled "Apparatus, Method And System For Intelligent Tandeming Of Incoming Calls To Application Nodes in Telecommunication Systems", filed concurrently herewith and commonly assigned to Lucent Technologies, Inc., and incorporated by reference herein, with priority claimed for all commonly disclosed subject matter (the "related application").

FIELD OF THE INVENTION

The present invention relates in general to wireless and wireline telecommunication systems, and more particularly, to an apparatus, method and system for intelligent tandeming of incoming calls to application nodes in telecommunication systems.

BACKGROUND OF THE INVENTION

With the advent of increasingly sophisticated telecommunication services, various systems have been created which allow "tandeming" of an incoming call leg to an application node. Such tandeming is utilized to implement various advanced services, especially in mobile or other wireless environments, such as calling party pays services, prepaid services, and one number services. For calling party pays services, an application node generates billing and other information, for telecommunication services to be billed to the calling (or "A") party, rather than being billed to the called party. For prepaid services, the subscriber (called or "B" party) has prepaid for particular types of services, such as having paid in advance for an amount of communication time for wireless communication services. For one number services, the application typically sequentially alerts various telephones of the subscriber, such as first alerting a home (wireline) telephone, and if unanswered, sequentially alerting a mobile telephone, followed by alerting a paging device.

To provide such services, an incoming call leg for a subscriber directory number (as a called party directory number) is typically tandemed by a network switch to an application node within the telecommunications network. In such tandeming, a call leg which is incoming to a network switch on a predetermined trunk group is routed to an application node, rather than directly delivered to the subscriber. Following performance of the particular application, such as determining that the subscriber has sufficiently prepaid his or her account to support another incoming call, the incoming call leg is then routed back to the network switch, for subsequent delivery or routing to the subscriber.

In the prior art, such tandeming is performed both on a group basis and on an all-or-none basis. For example, for certain groups of subscribers, typically designated by trunk groups, incoming call legs are automatically tandemed to an application node, while for other groups of subscribers, also typically designated by trunk groups, incoming call legs are never tandemed, with all incoming call legs always directly routed to the subscriber.

In addition, in the prior art, if the tandeming is unsuccessful, no provision is made for call delivery to or other services for the subscriber. Instead, the prior art systems typically provide only a reorder (fast busy) announcement to the calling party, who must then redial the call. Such lack of call delivery unnecessarily uses network resources, and unnecessarily loses potential revenue for these undelivered, tandemed calls.

As a consequence, a need remains to provide for message-based intelligent tandeming, where incoming calls may be tandemed or not tandemed to an application node on an individual basis, rather than a group basis. Such tandeming should also provide for a configurable default mode, to avoid unnecessary use of network resources and to avoid a potential loss of revenue. Such tandeming should also be cost effective, capable of implementation in existing telecommunication systems, and should be user friendly and user transparent. In addition, such tandeming should be dynamic and responsive to changing environmental and user conditions which may arise in wireless or wireline communication systems.

SUMMARY OF THE INVENTION

An apparatus, method and system are provided for message-based intelligent tandeming of an incoming call to an application node in telecommunication systems. The various embodiments utilize a new parameter, referred to as a tandem parameter, to designate whether incoming calls to a particular subscriber are to be tandemed to an application node or are to be delivered directly to the subscriber.

In the preferred embodiment, the tandem parameter is a predesignated value of a field within an ANSI-compatible calling features indicator parameter, and may be utilized within a plurality of ANSI-compatible messages, including a registration notification return result, a qualification request return result, a location request return result, and a qualification directive (invoke). In the preferred embodiment, tandeming may be indicated by a predetermined value of the tandeming parameter, and non-tandeming by another, different value of the tandeming parameter. Equivalently, tandeming may be indicated by including the tandeming parameter in an appropriate message, and non-tandeming by not including the tandeming parameter in an appropriate message.

The preferred system embodiment includes an adjunct network entity, a database, and a switching center. The adjunct network entity, such as a service circuit node or service control point, has one or more application nodes or platforms, supporting various telecommunication services such as prepaid services, calling party pays services, and one number services. The database, such as a home location register or visitor location register, stores information such as subscriber profiles, and includes storing the tandem parameter (or, equivalently, a value for the tandem parameter).

The switching center is configured to receive an incoming call leg directed to a called party directory number, to transmit a first message, such as a location request message, to the database to determine call treatment instructions, and to receive from the database a second message containing a tandem parameter, such as a location request return result message. When the tandem parameter does not indicate tandeming, the switching center routes the incoming call leg to the called party directory number. When the tandem parameter does indicate tandeming, the switching center obtains a routing parameter and performs digit analysis of the called party directory number. When the digit analysis has been performed successfully, the switching center tandems the incoming call leg to the application node, and when the digit analysis has not been performed successfully, the switching center provides a default mode for the incoming call leg.

In the preferred embodiment, the default mode is individually configurable by a service provider, for subscriber preferences. In the event of a tandeming (digit analysis) failure, the switching center is further configured to transmit to the database a third message indicating a tandeming failure, as a predetermined value in an ANSI-compatible redirection reason, and to request secondary treatment instructions. Following reception of a response message, the switching center performs a designated secondary treatment, such as routing the incoming call leg to the called party directory number, forwarding the incoming call leg to a second directory number, forwarding the incoming call leg to a message service, or providing for an announcement to a calling party of the incoming call leg.

Numerous other advantages and features of the present invention will become readily apparent from the following detailed description of the invention and the embodiments thereof, from the claims and from the accompanying drawings.

DETAILED DESCRIPTION OF THE INVENTION

Figure 1:
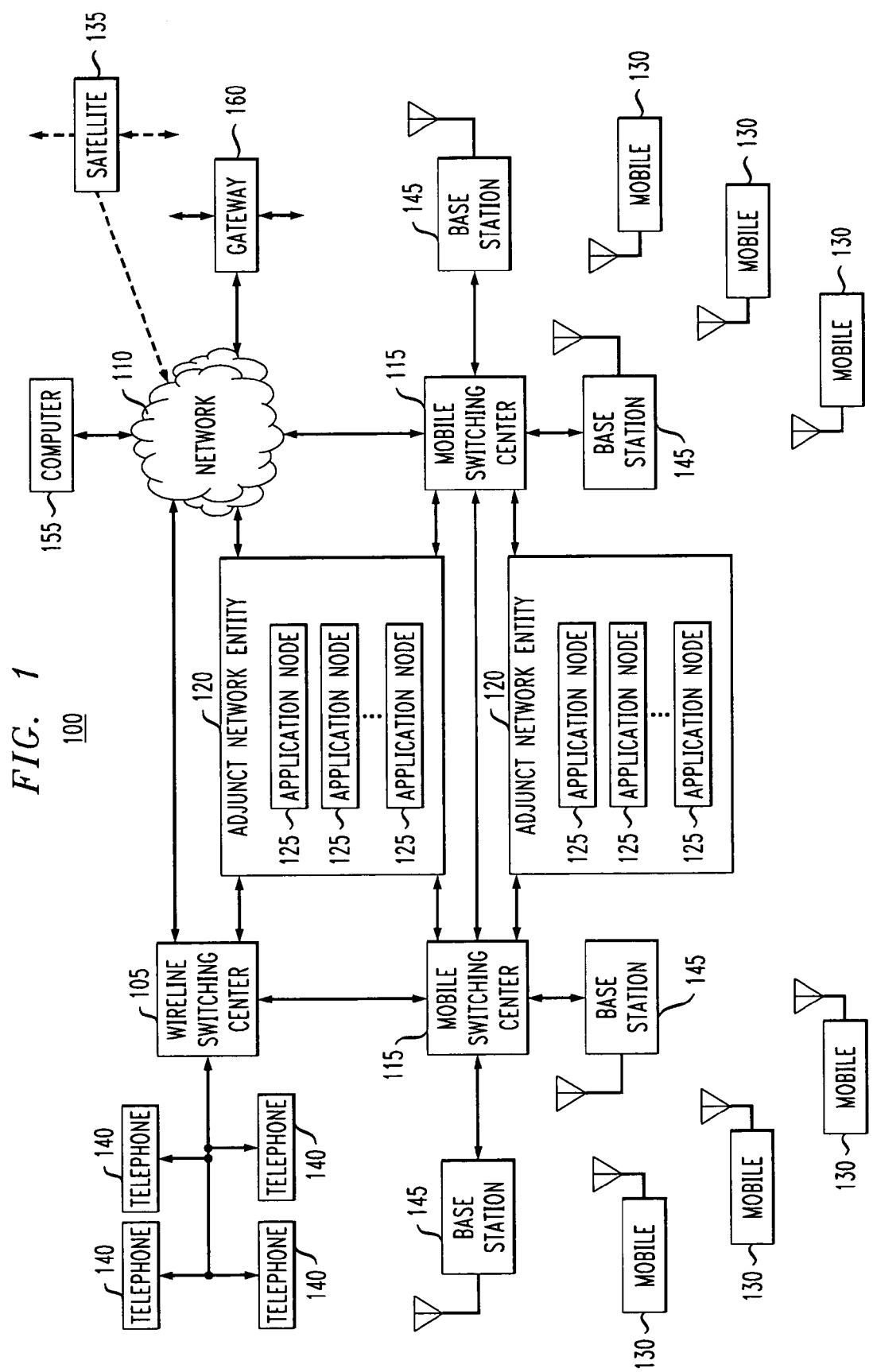
FIG. 1 is a block diagram illustrating a system embodiment to provide for message-based intelligent tandeming of incoming calls to application nodes in telecommunication systems in accordance with the present invention.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide for message-based intelligent tandeming, where incoming calls may be tandemed or not tandemed to an application node on an individual basis, rather than a group basis. Such message-based intelligent tandeming is provided in accordance with the present invention. The various embodiments of the present invention also provide for an individually configurable default mode for the subscriber, to avoid unnecessary use of network resources and to avoid a potential loss of revenue. The message-based intelligent tandeming of the present invention is cost effective, capable of implementation in existing telecommunication systems, and is user friendly and user transparent. In addition, such message-based intelligent tandeming is dynamic and responsive to changing environmental and user conditions which may arise in wireless or wireline communication systems.

FIG. 1 is a block diagram illustrating a system embodiment to provide for intelligent tandeming of incoming calls to application nodes in telecommunication systems in accordance with the present invention. The system 100 includes one or more mobile switching centers ("MSCs") 115 and one or more wireline switching centers 105 (collectively "switching centers"), which may also be connected via trunk and signaling lines to each other and to a broader network 110, such as to a public switched telephone network ("PSTN"), with multiple telecommunication connections to other locations, such as providing a link to a satellite 135, which may be one or more communications or global positioning system satellites, and providing a link to a gateway 160, such as for international communication or packet-based communication. The system 100 may also have a network (such as internet) connection to one or more computers 155 (or other network communication device).

The system 100 may also include one or more intelligent network devices referred to as adjunct network entities 120, such as a home location register ("HLR"), a visitor location register ("VLR"), another type of database, a service control point ("SCP"), a service circuit node ("SCN") (also referred to as a service node), an intelligent peripheral ("IP"), or another intelligent network device. One or more adjunct network entities 120 are preferably connected or coupled to a wireline switching center 105 and to a MSC 115. In the preferred embodiment, the adjunct network entities 120 provide a node or platform for particular applications, referred to herein as "application nodes" 125, such as a voice mail application, a calling party pays application, a prepaid application, a one number service application, and other intelligent network applications.

The wireline switching center 105 is also generally connected to a plurality of telephones 140 or other customer premise equipment, while the MSCs 115 (via base stations 145 or other wireless transceivers) typically have a wireless link to the various mobile units 130, such as cellular telephones, within a particular geographic region, for voice and data communication. In addition, while the wireline and mobile switching centers 105 and 115 are usually physically separated due to regulatory and other historical reasons, these switching centers may also be combined into one or more switching centers having both wireline and wireless functionalities.

Figure 2:
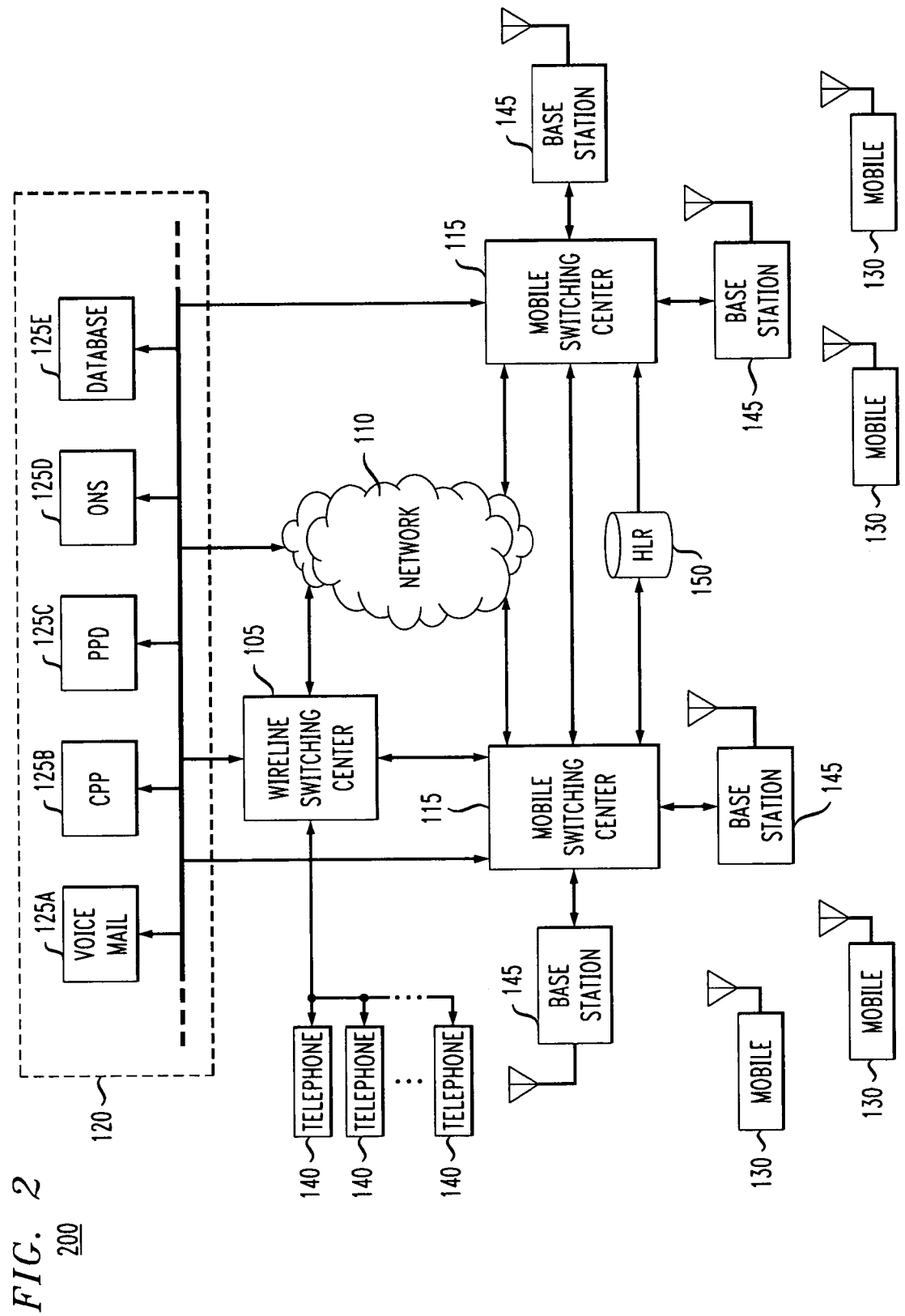
FIG. 2 is a block diagram illustrating, in greater detail, application nodes of a preferred system embodiment to provide for message-based intelligent tandeming of incoming calls to application nodes in telecommunication systems in accordance with the present invention.

FIG. 2 is a block diagram illustrating, in greater detail, the application nodes 125 of a preferred system embodiment 200 in accordance with the present invention. The system 200 also includes one or more switching centers, which are preferably mobile switching centers (MSCs) 115, but also within the scope of the invention may be wireline switching centers 105. The various switching centers 115 and 105 may also be connected via trunk and signaling lines to each other and also to a broader network 110, including a gateway 160. For ease of explanation, various application nodes running on one or more adjunct network entities 120 are separately illustrated in FIG. 2, such as a voice mail application node 125A, a calling party pays ("CPP") application node 125B, a prepaid service ("PPD") application node 125C, a one number service ("ONS") application node 125D, and a database application node 125E (collectively referred to as application nodes 125); it should be understood, however, that such application nodes 125 are applications or platforms running or operating within adjunct network entities 120, such as within SCPs and SCNs. Also as illustrated in FIG. 2, a particular type of database, a home location register ("HLR") 150, is separately illustrated as a stand-alone HLR 150; in other embodiments, such HLR functionality may be integrated into any of the switching centers 115 or 105 (as an integrated home location register ("I-HLR")). As illustrated, the various switching centers 115 or 105, respectively, have a wireless link to the various mobile units 130, such as cellular telephones (via base stations 145 or other wireless transceivers), or may be coupled to a plurality of telephones 140 or other customer premise equipment.

Continuing to refer to FIG. 2, an incoming call leg may be received at or by one of the switching centers 115 or 105. Such an incoming call leg may be from the network 110, such as from the PSTN or from the gateway 160, and also may be from a mobile unit 130 or a telephone 140, wherever located. As used herein, the switching center 115 or 105 that has received the incoming call leg is referred to as an "originating" switching center 115 or 105. For a mobile environment, the originating MSC 115 which receives the incoming call leg may or may not also be a preassigned or "home" MSC 115 of the called party's (subscriber's) mobile unit 130. In many instances, the originating switching center 115 or 105 may receive an incoming call leg from any number of sources, such as from the network 110 or another mobile unit 130, for routing the incoming call to another switching center 115 or 105 for delivery to the subscriber or for tandeming the incoming call to an application node 125. In addition, for purposes of the present invention, the switching centers 115 or 105 may use either a stand-alone HLR (such as HLR 150) or may include an I-HLR functionality.

Prior to routing or delivering the incoming call leg to a called party or to an application node 125, in accordance with the present invention, the originating switching center 115 or 105 transmits a location request or equivalent message to a database, such as to HLR 150 or to an I-HLR, or to a home MSC 115 (if any) (which, in turn, similarly accesses a database such as HLR 150 or an I-HLR), to obtain call treatment or handling instructions. By accessing the HLR 150 or other database 125E, the switching center 115 or 105 determines a subscriber profile of the called party, typically correlated to the subscriber directory number ("DN") or the subscriber mobile unit 130 identification number. The subscriber profile typically includes various parameters designating the type of service to be received by a subscriber (or the subscriber's particular mobile unit 130) and other telecommunication features provided to the subscriber (or the subscriber's particular mobile unit 130).

As discussed in greater detail below, in accordance with the present invention, a new parameter, referred to herein as a tandem parameter, is included within the subscriber profile in the preferred embodiment. Various elements of the subscriber profile, including the tandem parameter, are returned (by the HLR 150 or the home MSC 115) in a response message to the originating switching center 115 or 105, typically as a location request return result.

Based upon the parameters included in the subscriber profile of the called party in the response message, the incoming call leg may or may not be tandemed to one of the application nodes 125. When the subscriber profile, through the tandem parameter, does not indicate that the incoming call leg should be tandemed to an application node 125, the (originating) switching center 115 or 105 may perform various actions, such as paging a mobile unit 130, receiving a page response, and routing or delivering the call leg to the called party (such as to the subscriber's mobile unit 130). When the incoming call leg is not to be tandemed to an application node 125, the tandem parameter either may be excluded from this response message, or for the preferred embodiment, a predesignated field within the response message (predesignated for the tandem parameter) is set or encoded to a first predetermined value indicating non-tandeming.

Additionally, a home MSC 115 (having received a location request from an originating MSC 115), for an incoming call leg which is not to be tandemed, also may locally page a mobile unit 130 (for subsequent call routing), or may send a routing request invoke message to the last known location of the mobile unit 130. The home MSC 115 then sends a response message, such as a location request return result, back to the originating MSC 115, indicating, for example: (1) that the particular mobile unit 130 is within the service range of the originating MSC 115, and the incoming call leg should be routed to the particular mobile unit 130; or (2) that the mobile unit 130 is located elsewhere, and the incoming call leg should be routed to a temporary local directory number ("TLDN") or to any other routing or destination digits for delivery to the subscriber mobile unit 130.

Prior to routing or tandeming, the originating switching center 115 or 105 receives, at a minimum, elements of the subscriber profile from a database (such as HLR 150) or from a database (such as HLR 150) via a home MSC 115, typically within a response message such as a location request return result. When the incoming call leg is to be tandemed to an application node 125, the tandem parameter is included in this response message, and for the preferred embodiment, a predesignated field within the response message (predesignated for the tandem parameter) is set or encoded to a second predetermined value indicating tandeming. When the subscriber profile (through the tandem parameter) indicates that the incoming call leg should be tandemed to an application node 125, the originating switching center 115 or 105 obtains (local) routing parameters, such as dialing classes, rate centers, routing classes, and origination indicators, which determine, among other things, the outgoing trunk group for routing the call and the appropriate application node 125 for tandeming.

The originating switching center 115 or 105 then performs digit analysis of the called party DN, which is also used for routing. The digit analysis of the called party directory number determines a pattern match for available trunk groups and formats for outgoing tandeming of the incoming call leg (such as ISUP, DTMF or R2 signaling). If this digit analysis is successful, then the incoming call leg is routed or transferred ("tandemed") to an appropriate application node 125 (as indicated by either the subscriber profile, the incoming trunk group or the routing parameters). Following such routing to an application node 125 and performance of the appropriate functions by the application node 125, the call leg is returned to the originating switching center 115 or 105 by the application node 125. The call leg returned to the switching center 115 or 105 may be on a trunk group which does not provide for tandeming and which specifically bypasses any further tandeming or tandeming analysis, or in the preferred embodiment, includes appropriate messaging (such as the first predetermined value of the tandem parameter) which indicates no further tandeming of the call leg. The call leg is then routed by the switching center 115 or 105 to the called party, such as to a mobile unit 130.

If this digit analysis for routing to an application node 125 is unsuccessful, in accordance with the present invention, an individually configurable default mode is provided. The originating switching center 115 or 105 transmits a message, to either the database (such as HLR 150) or the home MSC 115, indicating a tandem failure (as a redirection reason) and requesting further instructions, such as instructions for secondary treatment of the incoming call leg. In the preferred embodiment, this message is transmitted as a "transfer to number" message. Also in the preferred embodiment, and in accordance with the present invention, this message includes use of a new value of an existing parameter, a redirection reason, with a new and previously unused value of "9" indicating a tandem failure. The requested instructions for secondary treatment may be individually configured for the particular subscriber. Depending upon the instructions returned from either the database (HLR 150) or home MSC 115, the originating switching center 115 or 105 routes or transfers the incoming call leg accordingly, for example, transferring the incoming call leg for call forwarding or transferring (tandeming) the call to voice mail 125A (or another message recording service).

For example, from the network 110, an incoming call leg may be received by an originating switching center 115 for a mobile unit 130 (subscriber or called party) directory number. The originating switching center 115 determines, from the subscriber profile (of the particular mobile unit 130), whether to tandem the incoming call leg to an indicated application node 125, or whether to directly deliver the incoming call leg to the particular mobile unit 130. In the preferred embodiment, this is accomplished by transmitting a message, such as a location request, to a database (such as HLR 150 or an I-HLR) or to a home MSC 115 (which, equivalently; then accesses a database such as HLR 150), followed by receiving a response message, such as a location request return result, containing elements of the subscriber profile, including the tandem parameter (or, more specifically, a value of the tandem parameter which indicates tandeming or no tandeming). Continuing with the example, if the subscriber profile indicates that the particular mobile unit 130 has prepaid service which requires tandeming, the originating switching center 115, upon receipt of the response message with an appropriately coded tandem parameter, will obtain corresponding routing parameters, perform digit analysis to obtain routing data, followed by routing (outpulsing) the incoming call leg to the prepaid application node 125C. Following its determinations, such as credit determinations, assuming sufficient credit, the prepaid application node 125C will route the call leg back to the originating switching center 115, and will do so on a return trunk group which is not designated for tandeming or will utilize appropriate messaging for no further tandeming. The originating switching center 115 then routes or delivers the call to the mobile unit 130, either directly or through one or more additional switching centers 115 or 105. In the event of a tandem failure, the incoming call leg may be afforded secondary treatment, as a default mode individually configured for the subscriber.

Of particular significance for the present invention, and as disclosed in the related application, is the use of a new parameter, referred to as a "tandem parameter, in a subscriber profile, to designate appropriate tandeming of incoming calls for the subscriber (as the called party, via a mobile unit 130 or telephone 140). (The tandem parameter is also referred to as a "call time" parameter in legacy systems, with a new value within a call time parameter utilized to indicate tandeming). This new tandem parameter, in the preferred embodiment, is stored in a database such as an HLR 150, and for roaming conditions, may also be stored in a VLR of the corresponding (originating) switching center 115. With use of the new tandem parameter, incoming call legs may be tandemed on an individual, rather than a group (trunk group) basis, in accordance with the present invention.

The new tandem parameter used in a subscriber profile is preferably implemented to be compatible with the ANSI-41 standard for mobile communication promulgated by the American National Standards Institute. In the preferred embodiment, the new tandem parameter is added to the variable length "calling features indicator" parameter used, among other places, in ANSI-41 messages such as a registration notification return result message, a qualification request return result message, and a qualification directive (invoke) message. In the preferred embodiment, the tandem parameter is also used within an ANSI-41 compatible location request return result message, transmitted from a HLR 150 or a home MSC 115 to an originating switching center 115.

The tandem parameter may be encoded in various ways, for example, as a single, double or triple octet. The encoding of the tandem parameter may also include the encoding of a potential default mode, such as tandeming to a particular application node 125, followed by playing an announcement to the calling party if the tandeming (digit analysis) fails, or followed by transferring to a specified directory number if the tandeming (digit analysis) fails.

Use of the new tandem parameter in these various ANSI-41 messages, in accordance with the present invention and the invention of the related application, allows for message-based intelligent tandeming regardless of where the mobile unit 130 may be located, such as regardless of whether the mobile unit 130 is in its home region or is roaming in a visited region. By including or excluding such a parameter, or by varying a value of such a tandem parameter, all within a subscriber profile maintained in a central database (such as HLR 150), that information is available to a home switching center 115 and to a non-home switching center 115 (through inclusion of the parameter in various messages, and for storage and access in the corresponding VLR). For example, as a mobile unit 130 enters or powers up in a non-home, visited region, the switching center 115 of the visited region may transmit a registration notification message to the HLR 150 of the home region and, in turn, will receive a registration notification return result message containing information pertaining to the subscriber profile, including the new tandem parameter, which is then stored in a VLR of the switching center 115 of the visited region. For incoming calls to or from the roaming mobile unit 130, the VLR is accessed by the switching center of the visited region, with intelligent tandeming decisions made accordingly, based upon the new tandem parameter.

Also significant in the various embodiments of the present invention is the availability of individually configurable default modes in the event of a tandeming failure. For example, in the preferred embodiment, a tandeming failure is included as a new parameter or as a new value within a redirection reason parameter, and is transmitted as part of a request for further instructions message, such as a "transfer to number" message, to provide individually configurable secondary treatment of the incoming call leg. Use of such a tandeming failure, as a new parameter, provides increased options for default programming, greater sophistication, and corresponding higher levels of user satisfaction in implementing telecommunication features utilizing tandeming.

In addition, to respond to changing environmental and subscriber needs, a subscriber profile may be dynamically modified, as needed, to include or exclude the new tandem parameter, or to change the value of the new tandem parameter, and to individually configure default modes, for any particular service or feature that involves tandeming to an application node 125. This may be done through use of a central database (such as an HLR 150) to, for example, change a subscriber's profile (such as by excluding a tandem parameter for prepaid service or by changing the value of the new tandem parameter for prepaid service), in order to change a subscriber's service from prepaid to another payment plan, and eliminate the corresponding need for tandeming. Corresponding values of the new tandem parameter may be utilized to designate the use or non-use of other service features which involve tandeming to an application node 125.

Such use of a central database for services and features for a subscriber also provides greater flexibility and ease of use for service providers. The service provider may regularly and simply update or revise the new tandem parameter in such a central database, as needed, to add or remove services or telecommunication features requiring tandeming for any given subscriber.

Another advantage of the use of the new tandem parameter is that in order to change a subscriber's type of service, no trunk groups or directory numbers are required to be changed. Rather, a subscriber may retain the same DN, while nonetheless changing his or her service from a tandeming mode to a direct delivery mode, all through changes in database records.

Another advantage to the message-based intelligent tandeming of the present invention is its user transparency and user friendliness. For a service provider, intelligent tandeming decisions may be implemented through a parameter in a central database. For a subscriber, the intelligent tandeming decisions occur transparently, within the background of call routing.

Yet another advantage of the present invention is the elimination of the prior art circuitous routing requirements for tandeming applications. Typically, in the prior art, an incoming call to a mobile unit 130 in its home region was not subject to tandeming; rather, all incoming call legs to a home mobile unit 130 would be directly routed to that mobile unit 130. In order to implement services (such as prepaid service) in the prior art, incoming call legs for such a mobile unit 130 would be forced to a non-home switching center 115, for routing to an application node 125, followed by subsequent routing to the home switching center 115 for call delivery. Such prior art methodology unnecessarily uses additional network resources, such as additional trunk lines between switching centers 115 or 105.

In addition, the present invention also provides an individually configurable default mode, with corresponding secondary treatment of the incoming call leg, to avoid a loss or disruption of service, and corresponding loss of potential revenue to the service provider. In the prior art, if digit analysis (for routing to an application node 125) were unsuccessful, the call would not be completed, the calling party typically received a reorder message (a fast busy signal), and any potential revenue for that particular call would be lost. In accordance with the present invention, however, in the event that digit analysis for tandeming is unsuccessful, the tandeming is bypassed, with a default mode providing for any desirable alternative for the subscriber, such as call delivery, call forwarding or message recording services.

Figure 3:
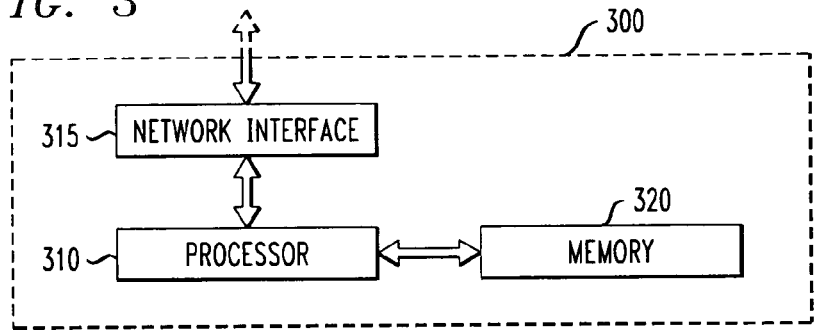
FIG. 3 is a block diagram illustrating an apparatus embodiment to provide for message-based intelligent tandeming of incoming calls to application nodes in telecommunication systems in accordance with the present invention.

FIG. 3 is a block diagram illustrating an apparatus embodiment 300 to provide for message-based intelligent tandeming of incoming calls to application nodes in telecommunication systems in accordance with the present invention. Such an apparatus 300 preferably may be included within a switching center 115 or 105, or distributed among a switching center 115 or 105 and an adjunct network entity 120 of a system 100 or 200. The apparatus 300 includes a processor 310, a network interface 315, and a memory 320. The network interface 315 is utilized to receive and transmit data, such as voice information, control messages, and other pertinent information, and may be utilized to receive incoming call legs and transmit outgoing call legs (for either tandeming or direct delivery to the subscriber). The memory 320 may be an integrated circuit (such as various forms of RAM), a magnetic hard drive, an optical storage device, or any other type of data storage apparatus. The memory 320 is used to store information pertaining to program instructions or configurations (discussed below), call management and other call information, such as subscriber profile information. The memory 320 performs such information storage, and may be included within a database (such as database 125E), or within an HLR or VLR, which may be stand-alone (such as HLR 150) or integrated (I-HLR) within a switching center 115 or 105, or may be included as other platforms within adjunct network entities 120.

Continuing to refer to FIG. 3, the processor 310 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above with reference to FIGS. 1 and 2, and also discussed in detail below with reference to FIG. 4, with associated memory, such as microprocessor memory or additional RAM, DRAM, SRAM, MRAM, ROM, EPROM or $E^2$PROM. The processor 310 with its associated memory may be configured (via programming or hard-wiring) to perform the methodology of the invention, as discussed above with reference to FIGS. 1–2 and as discussed below with reference to FIG. 4. For example, the methodology may be programmed and stored, in the processor 310 with its associated memory (and/or memory 320) and other equivalent components, as a set of program instructions (or equivalent configuration or other program) for subsequent execution when the processor 310 is operative (i.e., powered on and functioning). Equivalently, when the processor 310 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 310 is implemented in its entirety as a microprocessor, which is programmed to implement the methodology of the invention.

As mentioned above, in addition to incorporation within a switching center 115 (or 105), such an apparatus 200 may be distributed among a switching center 115 or 105 and an adjunct network entity 120. For example, the apparatus 300 may be distributed among an MSC 115 and an adjunct network entity 120, with the memory 320 incorporated within the adjunct network entity 120 (such as an HLR 150 or other database 125E), with the processor 310 having components within either or both the MSC 115 and the adjunct network entity 120, and with the network interface 215 incorporated within the MSC 115. Numerous other variations and equivalent embodiments will be readily apparent are also within the scope of the present invention.

Figure 4:
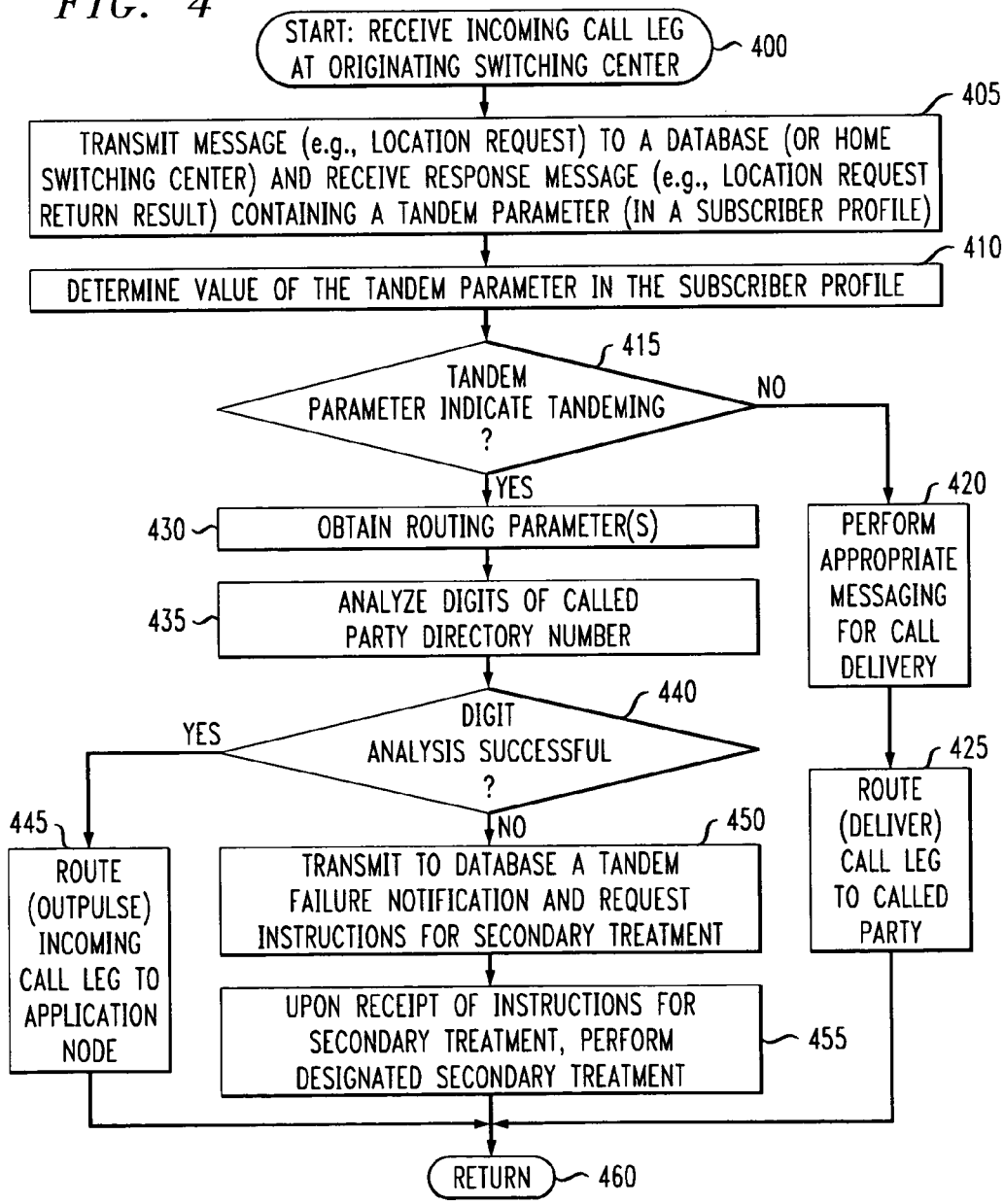
FIG. 4 is a flow diagram illustrating a method embodiment to provide for message-based intelligent tandeming of incoming calls to application nodes in telecommunication systems in accordance with the present invention.

FIG. 4 is a flow diagram illustrating a method embodiment to provide for message-based intelligent tandeming of incoming calls to application nodes in telecommunication systems in accordance with the present invention, and provides a useful summary of the present invention. The method begins, step 400, with reception of an incoming call leg for a called party at an originating network switch, such as at an originating switching center 115 or 105. The originating switching center 115 or 105 then transmits a message, such as a location request, to a database (such as HLR 150) or to a home switching center (which, equivalently, then accesses a database), and receives a response message, such as a location request return result, containing a subscriber profile of the called party (in whole or in part), step 405. The originating switching center 115 or 105 then obtains or determines a value of the tandem parameter within its predesignated field within the subscriber profile (or determines whether the tandem parameter has been included in the subscriber profile), step 410, and correspondingly determines whether the incoming call leg is to be tandemed, step 415.

When the subscriber profile does not indicate that incoming calls to the subscriber's (called party's) DN are to be tandemed in step 415, the method performs appropriate messaging and/or signaling for call set up and delivery, step 420, such as paging or transmitting a routing request. Following such appropriate messaging or signaling, the originating switching center 115 or 105 routes or delivers the call to the subscriber (via a mobile unit 130 or telephone 140), step 425.

When the subscriber profile does indicate that incoming calls to the subscriber's DN are to be tandemed in step 415, the switching center 115 or 105 obtains routing parameters for the incoming call to the subscriber's DN, step 430. The switching center 115 or 105 then performs digit analysis of the subscriber's (called party's) directory number, step 435. When the digit analysis is successful, step 440, the switching center 115 or 105 routes (outpulses) the call to an appropriate application node 125, step 445. When the digit analysis for tandeming is unsuccessful in step 440, the method proceeds to an individually configurable default mode, proceeding to step 450.

In step 450, the originating switching center 115 or 105 transmits a message, to a database (such as HLR 150) or to a home switching center, indicating a tandeming failure and requesting instructions for secondary treatment. As mentioned above, in the preferred embodiment, the tandeming failure is indicated as a new value in a redirection reason parameter, and is transmitted in a "transfer to number" message. As mentioned above, a service provider may configure a default mode for the individual subscriber's preferences, such as providing call delivery, providing call forwarding, providing messaging services, or providing an announcement to the calling party. Upon receipt of appropriate instructions, preferably in an ANSI-compatible message, the originating switching center 115 or 105 performs the designated secondary treatment, step 455, such as forwarding the incoming call leg to another directory number. Following steps 425, 445 or 455, the method may end, return step 460.

Numerous advantages of the present invention may be apparent from the above discussion. The various embodiments of the present invention provide for message-based intelligent tandeming, where incoming calls may be tandemed or not tandemed to an application node on an individual basis, rather than a group basis. The various embodiments include the use of a new tandem parameter, to designate appropriate tandeming in a subscriber profile, on an individual and modifiable basis.

The various embodiments also provide for an individually configurable default mode for the subscriber, to avoid unnecessary use of network resources and to avoid a potential loss of revenue. The message-based intelligent tandeming of the present invention is cost effective, capable of implementation in existing telecommunication systems, and is user friendly and user transparent. In addition, such message-based intelligent tandeming is dynamic and responsive to changing environmental and user conditions which may arise in wireless or wireline communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A method for message-based intelligent tandeming of an incoming call to an application node in telecommunication systems, the method comprising:
   (a) receiving an incoming call leg at a first node, the incoming call leg being directed to a called party directory number;
   (b) transmitting a first message to a database to determine call treatment instructions;
   (c) receiving a second message containing a tandem parameter;
   (d) when the tandem parameter does not indicate tandeming, routing the incoming call leg to the called party directory number;
   (e) when the tandem parameter does indicate tandeming, obtaining a routing parameter and performing digit analysis of the called party directory number;
   (f) when the digit analysis has been performed successfully, tandeming the incoming call leg to the application node, whereby when processing at the application node is completed the call leg is returned to the first node; and
   (g) when the digit analysis has not been performed successfully, providing a default mode for the incoming call leg.

2. The method of claim 1, wherein step (g) further comprises:
   transmitting a third message to the database, the third message indicating a tandeming failure.

3. The method of claim 2, wherein the tandeming failure is indicated as a predetermined value in an ANSI-compatible redirection reason.

4. The method of claim 2, further comprising:
   including a request for secondary treatment instructions in the third message; and
   upon reception of a fourth message in response, performing a secondary treatment, of a plurality of secondary treatments, designated in the fourth message.

5. The method of claim 4, wherein the plurality of secondary treatments include routing the incoming call leg to the called party directory number, forwarding the incoming call leg to a second directory number, forwarding the incoming call leg to a message service, and providing for an announcement to a calling party of the incoming call leg.

6. The method of claim 4, wherein the third message is an ANSI-compatible transfer to number message.

7. The method of claim 1, wherein the tandem parameter has a first predetermined value to indicate that the incoming call leg is not to be tandemed to the application node, and wherein the tandem parameter has a second predetermined value to indicate that the incoming call leg is to be tandemed to the application node.

8. The method of claim 1, wherein the tandem parameter is a predesignated value of a single-octet field within an ANSI-compatible calling features indicator parameter.

9. The method of claim 1, wherein the tandem parameter is a predesignated value of a field within an ANSI-compatible message of a plurality of ANSI-compatible messages, the plurality of ANSI-compatible messages including a registration notification return result, a qualification request return result, a location request return result, and a qualification directive (invoke).

10. The method of claim 1, wherein the first message is an ANSI-compatible location request message, and the second message is an ANSI-compatible location request return result message.

11. An apparatus for message-based intelligent tandeming of an incoming call to an application node in telecommunication systems, the apparatus comprising:
a network interface for reception, at a first node, of an incoming call leg directed to a called party directory number;
a memory; and
a processor coupled to the network interface and to the memory, wherein the processor, when operative, is configured to transmit through the network interface a first message to a database to determine call treatment instructions, and to receive through the network interface a second message containing a tandem parameter; the processor further configured, when the tandem parameter does not indicate tandeming, to route the incoming call leg to the called party directory number; the processor further configured, when the tandem parameter does indicate tandeming, to obtain a routing parameter and to perform digit analysis of the called party directory number; and the processor further configured, when the digit analysis has been performed successfully, to tandem the incoming call leg to the application node, whereby when processing at the first node is completed the call leg is returned to the first node, and when the digit analysis has not been performed successfully, to provide a default mode for the incoming call leg.

12. The apparatus of claim 11, wherein the processor is further configured to transmit through the network interface a third message to the database, the third message indicating a tandeming failure.

13. The apparatus of claim 12, wherein the tandeming failure is indicated as a predetermined value in an ANSI-compatible redirection reason.

14. The apparatus of claim 12, wherein the processor is further configured to include a request for secondary treatment instructions in the third message, and upon reception through the network interface of a fourth message in response, to perform a secondary treatment, of a plurality of secondary treatments, designated in the fourth message.

15. The apparatus of claim 14, wherein the plurality of secondary treatments include routing the incoming call leg to the called party directory number, forwarding the incoming call leg to a second directory number, forwarding the incoming call leg to a message service, and providing for an announcement to a calling party of the incoming call leg.

16. The apparatus of claim 14, wherein the third message is an ANSI-compatible transfer to number message.

17. The apparatus of claim 11, wherein the tandem parameter has a first predetermined value to indicate that the incoming call leg is not to be tandemed to the application node, and wherein the tandem parameter has a second predetermined value to indicate that the incoming call leg is to be tandemed to the application node.

18. The apparatus of claim 11, wherein the tandem parameter is a predesignated value of a single-octet field within an ANSI-compatible calling features indicator parameter.

19. The apparatus of claim 11, wherein the tandem parameter is a predesignated value of a field within an ANSI-compatible message of a plurality of ANSI-compatible messages, the plurality of ANSI-compatible messages including a registration notification return result, a qualification request return result, a location request return result, and a qualification directive (invoke).

20. The apparatus of claim 11, wherein the first message is an ANSI-compatible location request message, and the second message is an ANSI-compatible location request return result message.

21. A system for message-based intelligent tandeming of an incoming call to an application node in telecommunication systems, the system comprising:
an adjunct network entity, the adjunct network entity having the application node;
a database; and
a switching center couplable to the adjunct network entity and to the database, wherein the switching center, when operative, is configured to receive an incoming call leg directed to a called party directory number, to transmit a first message to the database to determine call treatment instructions, and to receive from the database a second message containing a tandem parameter; the switching center further configured, when the tandem parameter does not indicate tandeming, to route the incoming call leg to the called party directory number; the switching center further configured, when the tandem parameter does indicate tandeming, to obtain a routing parameter and to perform digit analysis of the called party directory number; and the switching center further configured, when the digit analysis has been performed successfully, to tandem the incoming call leg to the application node, whereby when processing at the application node is completed the call leg is returned to the switching center and when the digit analysis has not been performed successfully, to provide a default mode for the incoming call leg.

22. The system of claim 21, wherein the switching center is further configured to transmit a third message to the database, the third message indicating a tandeming failure.

23. The system of claim 22, wherein the tandeming failure is indicated as a predetermined value in an ANSI-compatible redirection reason.

24. The system of claim 22, wherein the switching center is further configured to include a request for secondary treatment instructions in the third message, and upon reception of a fourth message in response, to perform a secondary treatment, of a plurality of secondary treatments, designated in the fourth message.

25. The system of claim 24, wherein the plurality of secondary treatments include routing the incoming call leg to the called party directory number, forwarding the incoming call leg to a second directory number, forwarding the incoming call leg to a message service, and providing for an announcement to a calling party of the incoming call leg.

26. The system of claim 24, wherein the third message is an ANSI-compatible transfer to number message.

27. The system of claim 21, wherein the tandem parameter has a first predetermined value to indicate that the incoming call leg is not to be tandemed to the application node, and wherein the tandem parameter has a second predetermined value to indicate that the incoming call leg is to be tandemed to the application node.

28. The system of claim 21, wherein the tandem parameter is a predesignated value of a single-octet field within an ANSI-compatible calling features indicator parameter.

29. The system of claim 21, wherein the tandem parameter is a predesignated value of a field within an ANSI-compatible message of a plurality of ANSI-compatible messages, the plurality of ANSI-compatible messages including a registration notification return result, a qualification request return result, a location request return result, and a qualification directive (invoke).

30. The system of claim 21, wherein the first message is an ANSI-compatible location request message, and the second message is an ANSI-compatible location request return result message.

31. The system of claim 21, wherein the database is a home location register.

32. The system of claim 21, wherein the database is a visitor location register.

33. The system of claim 21, wherein the switching center is a mobile switching center.

34. The system of claim 21, wherein the switching center is a wireline switching center.

35. The system of claim 21, wherein the application node is a prepaid telecommunication service.

36. The system of claim 21, wherein the application node is a calling party pays telecommunication service.

37. The system of claim 21, wherein the application node is a one number telecommunication service node which sequentially alerts telephones of a subscriber.

38. The system of claim 21, wherein the switching center transmits and receives a plurality of messages, to and from the database, via a second switching center.

39. A tandem parameter, the tandem parameter for use in a message transmitted from a database to a network switch, the tandem parameter comprising:
    a first predetermined value, the first predetermined value designating that no tandeming is to be performed for an incoming call leg to the network switch; and
    a second predetermined value, the second predetermined value designating that tandeming is to be performed for the incoming call leg to the network switch, wherein the tandem parameter is encoded as a field within an ANSI-compatible message of a plurality of ANSI-compatible messages, the plurality of ANSI-compatible messages including a registration notification return result, a qualification request return result, a location request return result, and a qualification directive (invoke).

40. The tandem parameter of claim 39, wherein the tandem parameter is encoded as a single octet.

41. The tandem parameter of claim 39, wherein the tandem parameter is encoded as a plurality of octets.

42. The tandem parameter of claim 39, wherein the tandem parameter is encoded as a field within an ANSI-compatible calling features indicator parameter.

* * * * *